United States Patent
Ebling et al.

(10) Patent No.: US 6,970,947 B2
(45) Date of Patent: Nov. 29, 2005

(54) METHOD AND APPARATUS FOR PROVIDING A FLEXIBLE AND SCALABLE CONTEXT SERVICE

(75) Inventors: Maria Rene Ebling, White Plains, NY (US); Guerney Douglass Holloway Hunt, Yorktown Heights, NY (US); Hui Lei, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 10/198,283

(22) Filed: Jul. 18, 2002

(65) Prior Publication Data
US 2003/0018692 A1 Jan. 23, 2003

Related U.S. Application Data

(60) Provisional application No. 60/306,314, filed on Jul. 18, 2001.

(51) Int. Cl.[7] .................. G06F 15/16; G06F 15/173
(52) U.S. Cl. .................. 709/246; 709/225; 709/217
(58) Field of Search .................. 707/203; 709/327, 709/324, 321, 224, 316, 225, 246, 217, 202, 709/250; 710/36

(56) References Cited

U.S. PATENT DOCUMENTS

| | | | | |
|---|---|---|---|---|
| 5,910,180 A | * | 6/1999 | Flory et al. | 709/321 |
| 6,009,476 A | * | 12/1999 | Flory et al. | 709/324 |
| 6,321,279 B1 | * | 11/2001 | Bonola | 710/36 |
| 6,393,495 B1 | * | 5/2002 | Flory et al. | 719/327 |
| 6,442,620 B1 | * | 8/2002 | Thatte et al. | 709/316 |
| 6,549,918 B1 | * | 4/2003 | Probert et al. | 707/203 |
| 6,629,138 B1 | * | 9/2003 | Lambert et al. | 709/224 |
| 2003/0046401 A1 | * | 3/2003 | Abbott et al. | 709/228 |

* cited by examiner

Primary Examiner—David Wiley
Assistant Examiner—Micahel Delgado
(74) Attorney, Agent, or Firm—Thu Ann Dang; Anne V. Dougherty

(57) ABSTRACT

A flexible and extensible context server for collecting, maintaining, and disseminating context information is disclosed. The context server receives requests from requesters for context information via a secure context server interface (SCS API). Communication between the requesters and the context server is conducted by means of predetermined forms. The requests received at the SCS API are passed to a mediator, which collects data from various context drivers. Each context driver is coupled to the mediator, and collects predetermined type of context information from at least one context information source. The mediator determines the appropriate context driver which can handle the request, based on its type. Operation of the context server is also controlled by a set of context utilities, including a context cache for storing recently obtained context information, a privacy engine for storing privacy preferences and an event engine for event handling.

20 Claims, 5 Drawing Sheets

METHOD AND APPARATUS FOR PROVIDING A FLEXIBLE AND SCALABLE CONTEXT SERVICE

CROSS REFERENCE TO RELATED APPLICATION

The present application is based on U.S. provisional patent application No. 60/306,314, filed Jul. 18, 2001, from which priority is claimed.

BACKGROUND OF THE INVENTION

1. Field of the Invention

The present invention relates generally to the management of context information, and more particularly to a scalable and extensible system and method for collecting, maintaining, and disseminating such information.

2. Description of the Related Art

With the proliferation of small computing devices, wireless networking, and sensor technology, comes the ability to collect and maintain a wide variety of information about people, places, and objects. This information offers the opportunity to make application programs aware of the context of those people, places, and objects, which in turn will reduce the required amount of human attention to application programs. By tracking and interpreting the context of a person, place or object, context systems can automatically configure computing devices and direct information transfer without user intervention.

One system for managing context information (such information sometimes referred to in the literature as "awareness information") is described in commonly assigned and co-pending U.S. application Ser. No. 09/511,977, filed Feb. 24, 2000 (the "prior application"), incorporated herein by reference. The prior application describes a system for collecting context information and storing such information on an awareness server that can be contacted by a closed set of users and devices. Information is provided to the awareness server from registered users and machines by means of information packets that include a record identifier and an encrypted form of the data. When the awareness server receives an information packet, the identifier is checked for validity, and if valid, the attached context information is decrypted, further data source validity checking is performed, and the preferences of the information source and object are checked to determine authorized handling of the information. While the system described in the prior application is configured to receive and maintain context information of varying types, there is no means described for easily extending the system, after initial setup, to handle more diverse context information. In addition, the prior application does not provide a means for scaling to handle substantially greater volumes of context information of a given type.

As context computing becomes more prevalent, so will the need for simple communication between users and devices and the context service to which they subscribe. In the past, in order to update a context system to handle additional types of information, it was necessary for a programmer to manually alter the server code. With large context systems, this can become a bottleneck to system upgrades.

Clearly, as computing systems become more ubiquitous, there will be a need for the ability to quickly and easily extend context systems to handle information of diverse types, as well as to scale to the capacity of such systems to meet ever larger user communities. In addition, an easier method of requesting and exchanging information with context services will also be necessary.

SUMMARY OF THE INVENTION

It is an object of the present invention to provide a context service that can conveniently be extended to handle context information of varying types.

It is a further object of the invention to provide a context service that can be scaled to handle ever increasing amounts of context information.

It is a further object of the invention to provide a simple technique for exchanging information with a context server.

The present invention improves upon the prior art by providing a secure context server comprising an interface for receiving a request for the context information; a mediator, coupled to receive the request from the interface, for determining which one of context drivers to route the request to; and a plurality of context drivers, each coupled to the mediator, each context driver adapted to receive the request from the mediator and collect a predetermined type of context information from at least one context information source.

The present invention further provides a form-based data exchange format to simplify the exchange of information between a context server, its subjects, and information requesters.

In one aspect of the invention, scalability to handle ever larger amounts of information is achieved by providing a mechanism by which a context server can utilize various context information aggregators.

In a further aspect, the invention provides system extensibility to allow handling of diverse forms of information.

In a still further aspect, the invention provides means by which context information can be both queried and used as part of a notification service to trigger events, either on a one-time basis or continuously.

These and other objects, features and advantages of the present invention will become apparent from the following detailed description of preferred embodiments thereof, which is to be read in conjunction with the accompanying drawings, wherein like elements are designated by identical reference numerals throughout the several views.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to a method and apparatus for an efficient, extensible, and scalable system for the collection and maintenance of context information as well as for servicing requests for such information. It is to be appreciated that the present invention is not limited by the form or type of context information and it will be understood that the type of context information may include, but is not limited to, location, instant messaging status, temperature, calendar, velocity, direction of travel, application utilized, Web site visited, online presence, and online availability.

The user base of the present invention includes both subjects (those people, objects, or places for which the context server is collecting context information) and requesters (those people, applications, and services who submit a request to the context server for information on a subject). The subject owner controls the release of information regarding a particular subject. A request may be submitted through a GUI or some other application.

I. System Overview

Figure 1:
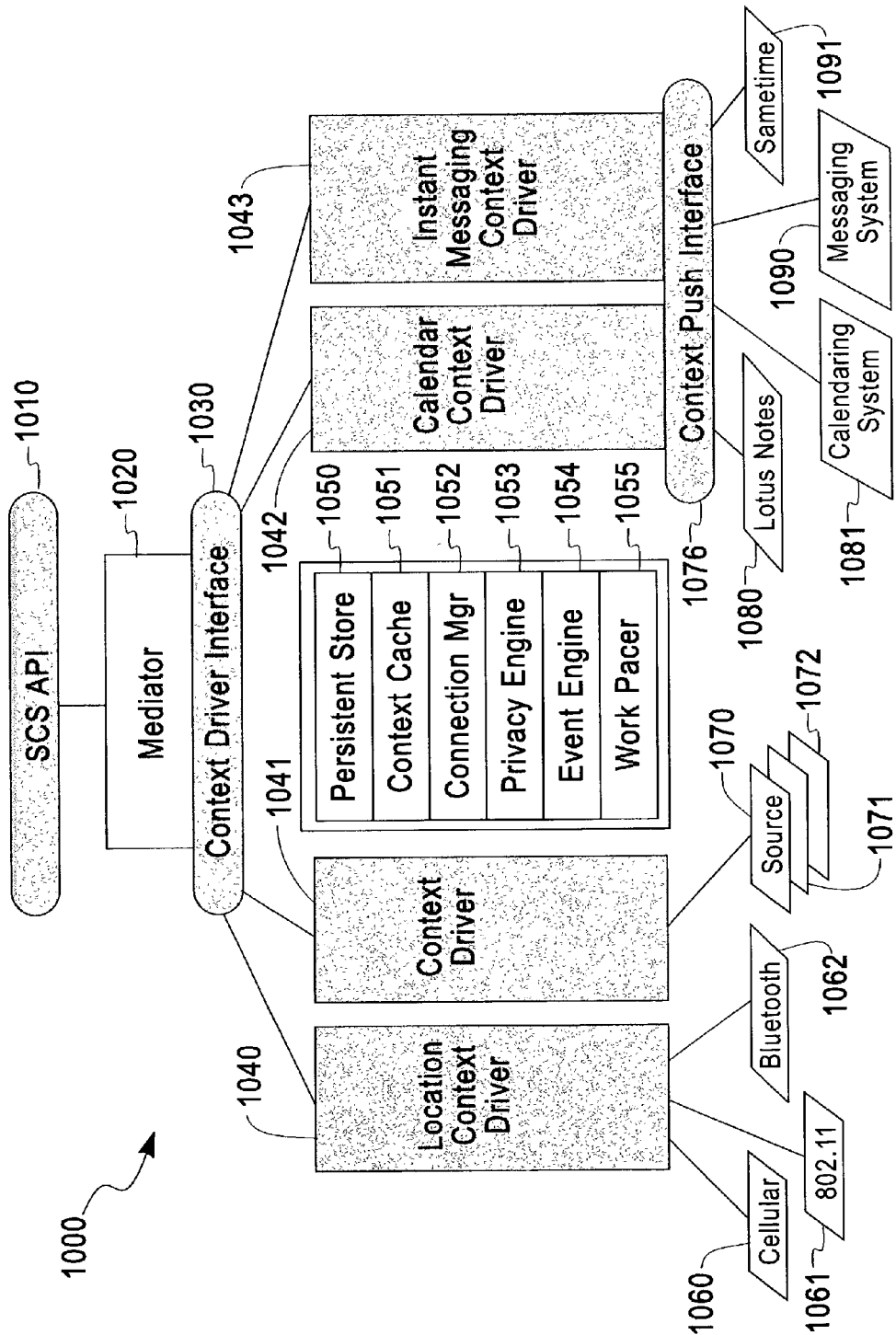
FIG. 1 shows a component diagram depicting an example of a context server system in accordance with the preferred embodiment of the invention.

The present invention may be more fully understood with reference to FIG. 1, which illustrates the components of a context service architecture in accordance with the preferred embodiment of the invention.

Figure 2:
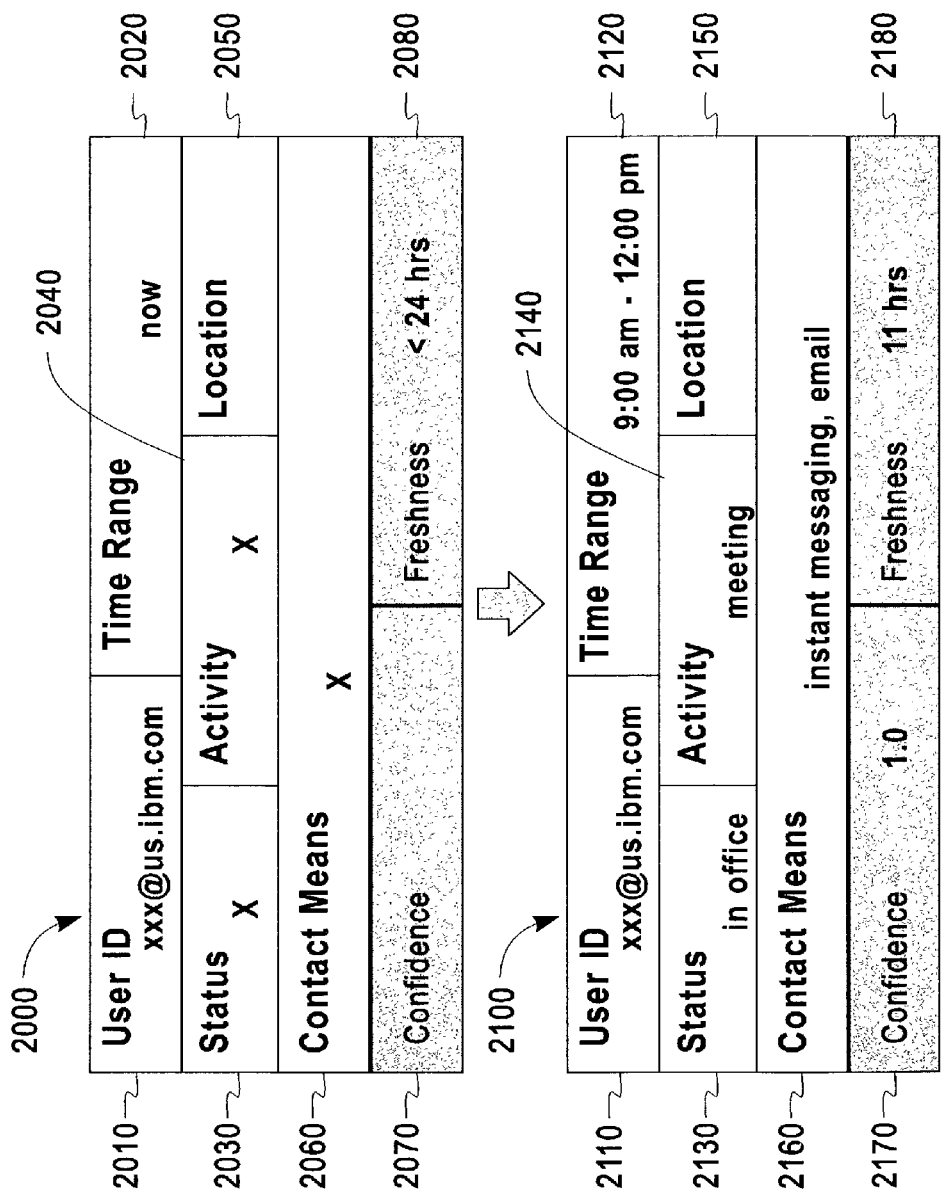
FIG. 2 shows a diagram depicting a example of a form for requesting context information and a form for responding to the request for context information.

FIG. 1 depicts an example of a context server 1000, the purpose of which is to gather, maintain, and distribute context information describing a variety of people, places, and things. The context server 1000, which is also referred to as a secure context server (SCS), receives requests for context information via a secure context server application program interface (SCS API) 1010. Such requests might originate from an end users (requester), device, application, or service needing to know the current context of a subject. In accordance with the preferred embodiment of the invention, communication between information requesters and context server 1000 is conducted by means of forms as shown in FIG. 2 and described in detail below.

Information requests received at the SCS API 1010 are passed to a mediator 1020, which aggregates or collects data from various context drivers 1040, 1041, 1042, and 1043. Communication between the mediator 1020 and the various context drivers occurs via a context driver interface 1030. The context drivers receive context information from a number of context sources 1060–1062, 1070–1072, 1080, 1081, 1090, 1091, while operation of the context server is controlled by a set of context utilities 1050–1055.

The secure context server of the present invention can be implemented as an application program running on a single data processing device, or across multiple data processing devices. The individual program components of the secure context server will now be described in detail.

II. System Interfaces

A. Forms-Based Interfaces

Clients request information through the SCS API 1010 by using a forms metaphor. Each type of context supported by the SCS is associated with a particular form. Each form contains a field that identifies its type and contains any number of additional fields. Each of these additional fields represents a piece of information related to the type of context in question.

Each request for context information presented to the SCS API 1010 is represented by a form. The request identifies the type of context by the type of form used. The requester fills in the fields with data that are known and identifies the unknown fields of interest. It then submits this partially filled out form to the SCS via the SCS API 1010. The SCS examines the form and fulfills the request by supplying the data to fill in the fields of interest as described below.

FIG. 2 shows an example form This particular form allows requesters to obtain calendar context information. It contains eight fields: User ID 2010, Time Range 2020, Status 2030, Activity 2040, Location 2050, Contact Means 2060, Confidence 2070, and Freshness 2080. The User ID 2010 identifies the subject whose data this form describes. The Time Range 2020 identifies the time period in question. The Status 2030 describes the subject's current status. The Activity 2040 describes the subject's current activity. The Location 2050 describes the location of this activity. The Contact Means 2060 indicates the preferred method of contacting the subject during this calendar event. The Confidence 2070 indicates the SCS's confidence in accuracy of this information The top half of FIG. 2 represents the form 2000 prepared by the requester that arrives at the SCS API 1010. The bottom half of FIG. 2 represents the form 2100 returned to the requester after processing by the SCS. As described, a single form will be returned to the requester per request. In an alternative embodiment, the SCS could return more than one form. Among other situations, it might do this in the event that it has multiple forms that match the request or that it has information from different sources, possibly conflicting.

In one implementation of the invention, some of the fields will accept commonly-used values or terms, and these commonly used terms can be predefined by the system for the convenience of the requester. For example, the system may have predefined certain common time ranges, including "now", "tomorrow", "yesterday", "morning", "afternoon", and "evening". One skilled in the art will recognize that other time ranges can also be predefined.

As previously described, prior to sending the form to the context service 1000, the requester will have filled in available information about the query, in this case the User ID 2010, the specified Time Range 2020, and the required Freshness 2080. The requester will have also identified which of the remaining fields are of interest, in this case the Status 2030, the Activity 2040, and the Contact Means 2060. The unmarked field, Location 2050, is not of interest to the requester and will not be filled by the context service. The remaining field, Confidence 2070, is computed for every request based on the information provided by the context source and the context server's confidence in the source. The results of this calculation are filled in for every request.

After processing this form, the context service returns the results to the requester in a form such as 2100 shown in FIG. 2. The User ID 2110 in the response remains unchanged from what the initial request 2010 specified. The time range 2120 has been identified as 9:00 am–12:00 pm (which includes "now", the value specified in the initial request 2020). The status 2130 is shown as "in office", the activity 2140 is "meeting", and the context means 2160 is "instant messaging, email". The freshness 2180 is identified and is within the last 24 hours, as the requester initially specified 2080. Also shown is the fact that the Location 2150, which was not indicated as being of interest to the requester, has been left blank and that the Confidence 2170 has been specified (1.0 indicates complete confidence in the results).

The requester could be an end user or could be another program. If the requester is an end user, then an interface to the SCS will need to be build. One skilled in the art will recognize that the SCS could be presented to the end user in a simple graphical, Web-based interface. The end user could select a supported context type from a pull-down list. The form associated with the selected context type could be present. The end user could fill in the known fields and indicate the fields of interest (e.g., by checking boxes). The end user could then submit the form. The graphical interface could then submit the form to the SCS through the SCS API 1010. Upon receiving a response from the SCS, it could then present the completed form to the end user. If the requester is a Java program, the programmer will create a new form object of the type appropriate to the type of context needed. The programmer will fill in the known data, indicate the fields of interest, and submit the form through the SCS API 1010. After the SCS API 1010 call completes, the programmer will then have available the information of interest and can access that information by referencing the appropriate form field.

In the present invention, privacy controls are implemented based upon form fields, with the indicated privacy settings being executed by the context server 1000. For example, subject owners can identify users or groups of users who are authorized to receive responses to queries about a particular context subject. Owners authorize access to information at the granularity of form fields. In this way, the context service allows owners to control the release of information about subjects (in the common case, this would be private information about the owner/subject). For example, the owner/subject might define two groups: family and colleagues. The owner might allow their family members to know their location at any time of day. They might allow their colleagues to know their location only during certain times of day, only if their status (e.g., 2030) is "traveling", or if their location is somewhere in the office, or some combination of those criteria.

One skilled in the art will recognize that other approaches could be used by the SCS API for applications to request context information. One alternative is to use a query interface, such as SQL. Another is to add custom requests for each type of context query. This second approach is significantly less flexible than the forms approach.

B. SCS API

The SCS API 1010 is a set of routines that the context server 1000 uses to process requests for context information received from other application programs. The SCS API is designed to define a format for message transfer between the secure context server and application programs requesting information. This format is described in more detail below with respect to the form depicted in FIG. 2.

Through the API, applications may query for the current context information synchronously (e.g., whether or not the subject is currently available via IM) or may submit a callback request to be notified asynchronously when a particular condition is met (e.g., the subject becomes available in IM). A callback request can further be categorized as a one-time callback or a continuous callback. With a one-time callback, the application will be notified when the specified condition is met the first time, after which the callback request becomes obsolete. With a continuous callback, the application will be notified whenever the specified condition is met. Both queries and callback requests are subject to an application-supplied or default expiration time.

C. Interfacing to Context Sources

Interaction with a context source can use either a push mechanism or a pull mechanism. With a push mechanism, the context source periodically pushes updated context information to the context service through the Context Push Interface 1076. In push mode, context information is received from context sources without the context service having explicitly requested the data (though obviously the push would need to be initialized). The context push interface 1076 defines a method that allows a context form containing updated context information to be submitted. With a pull mechanism, the context service must explicitly request context information using a protocol acceptable by the context source. In the preferred embodiment the pull interface is owned by the context source and not considered part of this invention. When using a pull interface the context server can either make this request on a periodic basis (polling) or when an application demand arises. In an alternate embodiment context sources may agree on a standard pull interface which simplifies the work of context drivers. A given context server can employ both push and pull mechanisms, for different information sources or for different subscription types.

III. System Components

A. Mediator

The mediator 1020 directs requests received from the SCS API 1010 to the appropriate context driver such as 1040, 1041, 1042, and 1043, and aggregates requests to the context drivers for complex requests.

Requests are directed to the appropriate context driver in the following manner. When a request for context information arrives, the mediator 1020 determines which context driver supports the type of form contained in the request. This determination is made based upon the type of the context form, as described previously. Once the context type has been determined, the request is forwarded to the appropriate context driver(s).

For example, a request for a subject's location would be submitted in a "LocationContextForm". The mediator 1020 would see that this is a LocationContext request and direct it to the location context driver 1040. Similarly, a request for a subject's instant messaging context would be directed to the instant messaging context driver 1043. If no context drivers support the form contained in the request, the mediator 1020 generates a response to the requesting application (to be sent via the SCS API 1010) informing it that the information is not available.

Aggregation of requests (i.e., the process of determining the appropriate context drivers from which to request information in the case where a request requires information from two or more context sources) is carried out by the mediator 1020 as follows. The context service accepts complex requests containing two or more forms, each partially filled out with related information, and a Boolean expression. For example, a request regarding whether a subject is actually attending a meeting that appears on his or her calendar could be serviced by the mediator 1020 but not by any single context driver shown in the present architecture. For this example, both the calendar context driver 1042 and the location context driver 1040 would have to be queried and the retrieved location of the current meeting compared with the subject's present location. In this example, the requesting application would submit two forms: a location context form and a calendar context form. The User ID field of each form would contain the target subject's ID and the time range would specify "now". The requesting application would indicate an interest in the target subject's location as well as the location of the target subject's meeting. The requesting application would also submit a Boolean expression. In this case, the Boolean expression would compare the value of the target subject's location to that of the target subject's meeting. If the two locations were the "same", then the request would be answered in the affirmative; if not, then the request would be answered in the negative.

The determination of whether the locations are the "same" is a complex issue, because while not identical, two locations may in fact be close enough that a human might consider them to be "close enough." One possible way to resolve the issue of sameness is to require the requester to specify how close to one another the locations must be to be considered the same, such as in terms of a distance between the actual location and the location of interest. A second understanding is that the system must have the dimensions of rooms available to it so that when a request arrives that requires the system to determine if something is inside or outside a room (or any place) it is capable of doing so. Such technology is well known, and beyond the scope of this invention.

It is envisioned that other means for measuring "sameness" could be employed. And also it is envisioned that other means for maintaining and aggregating requests could be employed.

B. Context Driver Interface

The context driver interface 1030 provides a uniform abstraction for context drivers. Every context driver is required to implement this context driver interface. The mediator 1020 interacts with each of the context drivers through this interface, without having to understand the details of interaction between context drivers and context sources. This allows new context drivers to be easily configured into the context service and existing context drivers to be modified without changing the rest of the context server.

The context driver interface 1030 declares methods for starting and terminating the driver as well as for determining the driver capability in terms of what forms it can handle. Further, it declares methods for handling the getContext( ) and requestCallback( ) methods in the SCS API 1010, and for handling the setContext( ) method in the Context Push Interface.

C. Context Driver Utilities

In one embodiment, the secure context server has a number of utilities that manage the storage, retrieval, maintenance, and dissemination of context information. These utilities include a persistent store 1050, a context cache 1051, a connection manager 1052, a privacy engine 1053, an event engine 1054, and a work pacer 1055. The context driver utilities could equally well be external to the main context service and need not be within the same process or located on the same computing machine. The context service maintains these utilities, for example the connection manager 1052, for the benefit of its context drivers—to relieve them each of the burden of maintaining the infrastructure necessary to collect and maintain the associated information. Each of the context driver utilities will now be discussed in detail.

C-1. Context Cache

Context cache 1051 stores recently used context information for rapid retrieval in case the information is subsequently requested. It may also store information that was obtained as a side effect of previous queries, but that was not itself requested. This cache stores the form data, possibly containing values for only a subset of the form fields. It is the job of the context driver to determine the best key or keys to associate with the data. For example, the location context driver 1040 stores form data keyed to the User ID and to the Location fields; these keys facilitate requests made about a subject as well as those made about the location. The cache replacement policy is LRU (Least Recent Used), though one skilled in the art will recognize that other caching policies could also be employed.

C-2. Persistent Store

Persistent store 1071 provides long-term, nonvolatile storage of context information. The persistent store can be constructed from a database or a file system. The persistent store utility provides interfaces to store context information, query stored information, and delete context information that was stored. The context drivers 1040–43 or the context mediator 1020 determine what information should be stored in the persistent store. The preferred embodiment is to use a database where the fields of context information correspond to columns of the database and each row is an entry. In this embodiment, each type of context information stored in the persistent store would use a separate table. Stores to the persistent store, queries of the persistent store, and deletions of data from the persistent store would all be done via standard database operations. The data stored in the database could be in either a raw form or encoded via XML or some other mechanism. If a file system is used, then these operations have to be provided for as part of the implementation.

C-3. Privacy Engine

The privacy engine 1053 manages the privacy preferences of the owners. Its job is to answer the question: Does the relevant owner allow the requester to access the requested information? Each owner may define a set of privacy policies associated with each context type. The policies in the set are defined in terms of the form for that type of context and can be specified for each field within that form. Each policy grants a user or a group of users access to particular form fields. Consider the form shown in FIG. 2. The owner might allow their colleagues access to the time range 2020 field, the status 2030 field, and the activity 2040 field, but he or she might only allow their spouse to have access to their preferred means of contact 2060. The owner's policies are stored in a per context form—per group method such that each context form can have a policy for each of the owner's groups. The policy itself is maintained as a bit vector, where each element of the vector grants or denies access to a particular field of the context form in question. A "1" represents granting the group access to the field whereas a "0" represents denying access to that field for that group.

When a request arrives, the context service 1000 must determine whether the requester has the privilege to access the requested context information. To make this determination, the context service 1000 queries the privacy engine 1053. The privacy engine 1053 begins by looking up the privacy policies of the person about whom the request is referring (e.g., the target subject). It then determines to which of the owner's groups the requester user belongs. For each such group, it determines whether or not the owner has granted that group access to the form field or fields referenced in the request. Thus, the input to the privacy engine consists of the identity of the requester, the identity of the subject, the type of context requested, and the fields requested. If any group to which the requester belongs is granted access to the requested information, then the requester is granted access; if no group is granted access, then the requester user is denied access.

It is envisioned that other means for maintaining privacy policies could be employed. It is also envisioned that the system could record the fact that, for legal or other reasons, the requester user was either granted or denied access to the subject's context information and what context information was released.

C-4. Event Engine

Event engine 1054 records event subscriptions in a subscription registry and matches the publication of events (i.e., event information received from context information sources) with existing subscriptions. An event subscription represents a request for notification upon the occurrence of a specified event. The event engine 1054 treats a requester's request for information as a subscription to context events, and the arrival of context information from a context source is treated as a publication of a context event. A piece of context information arrives when an external context source pushes the information to the context server, or when a context driver in the context server pulls information from an external context source. Each piece of context information that is pushed or pulled to the system is described in a context form. Each subscribed context event is also described in a context form, which may be only partially filled, as shown in 2000 of FIG. 2. Subscriptions in the subscription registry are organized by the context forms used to describe subscribed events and are matched against the publications described in the same form only. Every subscription has an expiration time. When the expiration time has elapsed, the subscription is removed. Every subscription also has a setting defining the minimum interval between matches, called the match interval. After a successful match, another match will not be attempted until this match interval has elapsed. Subscriptions are associated with a set of actions that should be taken when a match is found. They are also associated with a (possibly different) set of actions that should be taken when the subscription expires. These actions will be executed by the event engine when the match or expiration occurs.

Figure 3:
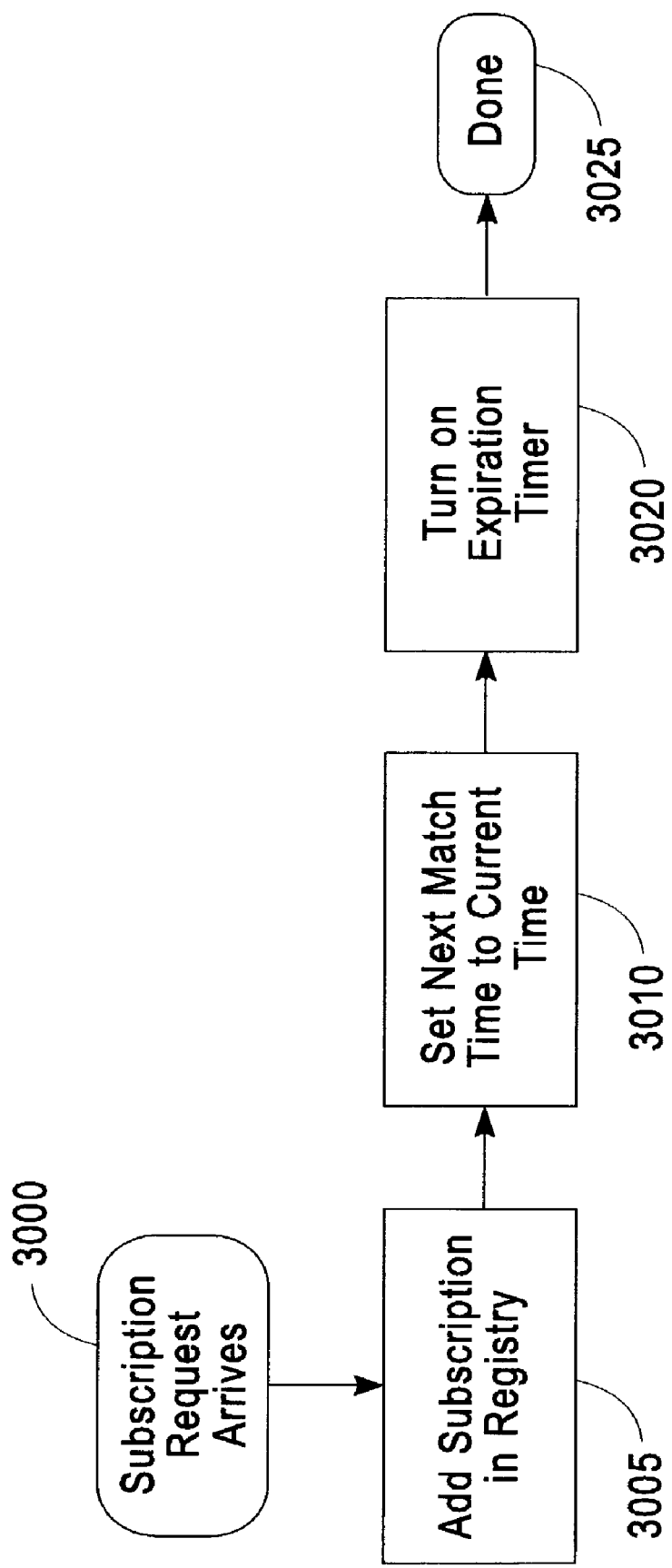
FIG. 3 shows a logical flow diagram illustrating the processing of event subscription by the event engine.

FIG. 3 shows an example of how an event subscription is processed by the event engine 1054. An event subscription is a Java object that contains information such as the expiration time and match interval, a method for checking whether a match has occurred, as well as methods to be invoked upon a match and the expiration respectively. After arriving at the event engine 1054 from a context driver (3000), the subscription is first recorded in a subscription registry controlled by the event engine (3005). One way to organize the registry is using a hash table with event topics as the hash key, although any method for organizing the registry is within the scope of the invention. The registry serves the purpose of locating all subscriptions that need to be matched against a publication in the same context form. Each subscription entry contains a field indicating the earliest time a match may be attempted for the subscription. Initially, the next match time is set to the current time (3010), indicating that a match can be attempted at any moment. A timer is then turned on (3020) which will go off at the expiration time of the subscription. The processing of the event subscription is then complete at step 3025.

Figure 4:
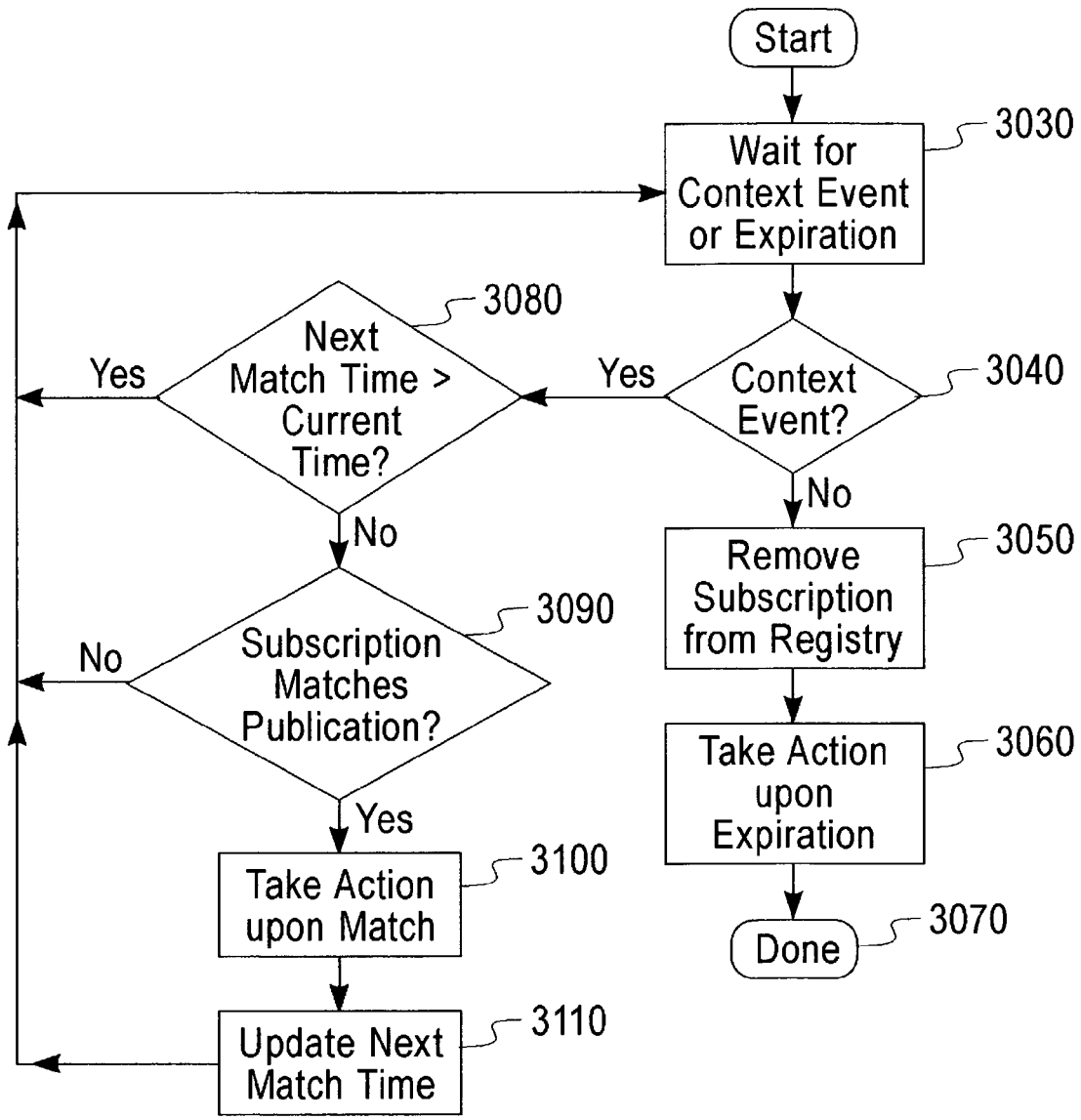
FIG. 4 shows a logical flow diagram illustrating the processing of context events and timer expiration by the event engine.

FIG. 4 shows an example of how the event engine 1054 processes context events and timer expirations. At step 3030, the system waits for a context event to occur, or the expiration of a subscription timer. When either occurs (3040), the system checks to see if it received a context event or a timer expiration. If the system received a context event, then the next match time of the subscription is compared against the current time (3080). If the next match time is beyond current time, no further processing should be performed for the subscription at this time and the system waits for a context event to arrive or the expiration of a subscription timer (3030). If the next match time is lapsed or current (3080), the subscription is matched against the publication (3090). If the match fails, the subscription waits for the next context event or the subscription expiration, whichever comes first (3030). If the match is successful, the desired action associated with a match is taken at step 3100 (for example, sending a notification to the application after checking for whether the requester is authorized to receive the information). The next match time is then increased by the match interval value specified for the subscription (3110). If the next match time exceeds the expiration time, then the subscription effectively expires. If the subscription expires while waiting for a context event (3040), the subscription information is removed from the subscription registry (3050). The action associated with the expiration is then taken at step 3060 and processing of this subscription completes at step 3070.

C-5. Connection Manager

A connection manager 1052 is provided for managing the connections between the pull-based context sources 1060–1062, 1070–1072, 1080 and the secure context server 1000. This is necessary to avoid the overhead of establishing a new connection each time the Secure Context Server 1000 needs to obtain information from a context source. For pull connections, the context drivers may make their connections directly and thus have to manage the set-up and tear-down of the connections themselves, possibly based on the frequency of pull requests. Alternatively, they can delegate the task to the connection manager to reduce the complexity of the context drivers.

C-6. Work Pacer

Also provided is a work pacer 1055. The work pacer 1055 schedules the pulling of context information from external context sources. For example, for a continuous monitoring request (the result of a continuous callback), the context driver checks to see if it can immediately satisfy the request from the cache. If it can, it responds and then schedules the next request for match interval time units in the future. If it cannot, it submits an asynchronous request for the necessary context information to the appropriate context source. When this request completes, the context driver deposits the returned information in the cache and repeats the above process. By utilizing the work pacer, the context driver ensures that information on the same context subject will not be fetched twice within any period of length minGap, the minimum amount of time that must elapse before two identical work items may run.

The work pacer 1055 schedules work items considering both the requested start time and the frequency of repeatedly performing "identical" work. The issue of what work items are "identical" is complex. A simple definition is that any two forms that specify the same context field values in the request are identical. For example, two forms that request the location of the same User ID and ignore all other fields would be considered identical work. Because these two work items are considered identical even if they were made as separate requests and possibly even by different parties, both requests should be satisfied by the same context information. It is the job of the applicable context driver to determine when two work units are identical. The work pacer 1055 guarantees that a work item will not be performed before the requested start time. It further guarantees that the time between starting two identical work items is no less than a specified minimal interval, called the minGap. It makes a best-effort attempt to schedule a work item as close to the requested start time as possible.

Figure 5:
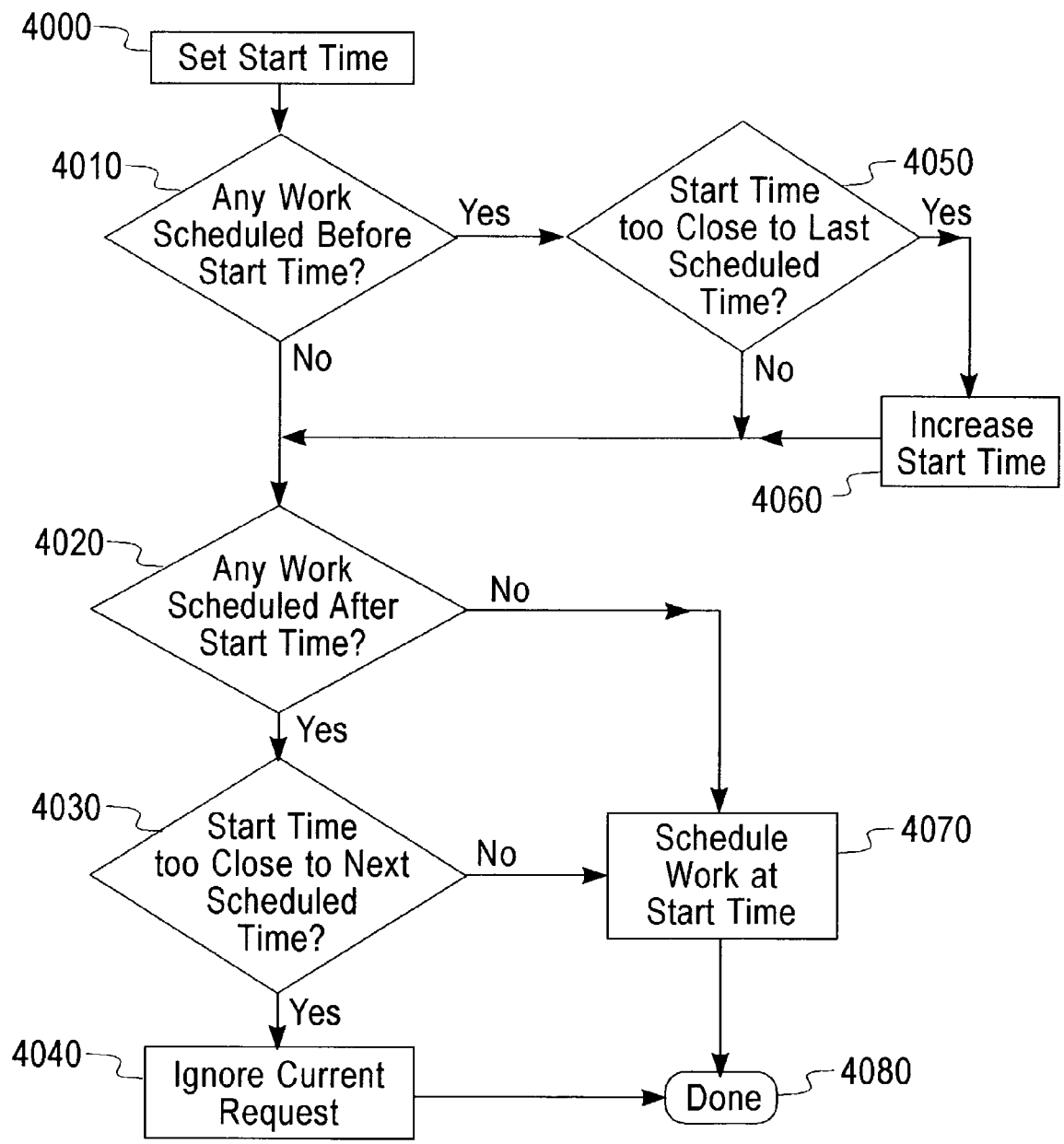
FIG. 5 shows a logical flow diagram illustrating how a work item is scheduled by the work pacer.

FIG. 5 illustrates an example of how a work item is scheduled by the work pacer. The start time for the work item is set to the later of the requested start time and the current time (4000). At this point, the work pacer must ensure that the work item can be inserted into a (possibly empty) queue of identical work items. The work pacer then checks to see whether or not the start time of any scheduled work items is earlier than the start time of this work item (4010). These include work items that may or may not have been started. If any identical work items have a start time before the start time of this item, then the start time of this item is compared against the start time of the work item that immediately precedes this work item (4050). If the start time is less than a time "minGap" away from this immediately preceding start time, then the start time of the current work item is increased to the sum of the last scheduled time and minGap (4060). Next, the work pacer determines whether any identical work items have start times after the start time of this work item (4020). If so, then the start time of this item is compared to the start time of the immediately following work item (4030). If the start time is less than minGap away from the time of the immediately following item, then the current request for performing the work is ignored (4040). Otherwise, the work item is scheduled for the start time (4070). The scheduling of this work item then completes (4080).

D. Context Drivers

Context drivers 1040, 1041, 1042, and 1043 will now be described. In general, the purpose of a context driver is to gather and distribute a specific type of context information. It encapsulates the details of interaction with context sources. It calls upon the utilities described above in performing its work. For extensibility, all context drivers are required to implement a uniform context driver interface, described earlier. In general, a context driver operates as follows: When a query for context information arrives at the appropriate driver via the mediator 1020, the driver begins processing by determining if the requester is authorized to receive the requested information by consulting the privacy engine 1053 and matching the requester's identification against the client's authorization preferences. If the requester is not authorized, the request is denied. Otherwise, the context driver checks with the context cache 1051 to see whether any information is cached on the context subject in question. If so, the cached information is published to the event engine 1054 so that a match can be attempted immediately against the application request. The context driver then submits a subscription to the event engine. The context driver specifies the expiration time of the subscription as the time-out value of the application request, which was either explicitly supplied by the application, or assigned to a default value by the context driver. The context driver sets the match interval of the corresponding subscription to be beyond the expiration time so that only one successful match is possible in the lifetime of the subscription. The context driver also includes in the subscription logic for determining whether a match for the application request is found. As a side effect of this logic, the context driver may initiate pulling of context information from the context source when a match is not found. The context driver further specifies that it should be notified when a match or the expiration occurs. It then waits to be notified by the event engine 1054. Upon receiving a notification, the context driver checks whether it is a notification of a match. If so, it returns the matched context form to the mediator 1020. If not, it reports request time-out to the mediator 1020. Upon receiving an asynchronous request, the context driver again begins processing by determining if the client is authorized to receive the requested information. The context driver then publishes to the event engine 1054 the cached information, if any, on the context subject in question. The context driver then submits a subscription to the event engine 1054. Again, the context driver specifies the expiration time of the subscription as the time-out value of the application request. For a one-time notification request, the context driver sets the match interval of the subscription to be beyond the expiration time. For a continuous monitoring request, the context driver sets the match interval to the minimum time between consecutive notifications specified as part of the application request. The context driver also includes in the subscription logic for determining whether a match for the application request is found. The context driver further specifies that the client application be notified directly when a match or the expiration occurs. After entering the subscription, the context driver returns control to the mediator 1020.

When the context driver receives new context information via the mediator 1020, it deposits the information in the context cache 1051. It then checks whether there are any subscriptions to this information. If so, it publishes the information to the event engine 1054 so that the subscriptions can be serviced by the event engine 1054.

E. Interacting with Context Sources

Each context driver (1040, 1041, 1042, 1043) receives context information from a different source. Location context driver 1040 receives location information for a subject from any of a number of possible sources, including, for example, a cellular source 1060 such as any cellular telephone service provider to which the client subscribes, a wireless LAN source 1061, such as that available from an 802.11 network, and a second wireless LAN source 1062, such as that available from a BlueTooth network.

In FIG. 1, a calendar context driver 1042 and an instant messaging context driver 1043 are also shown. These context drivers receive context information from various information sources. The calendar context driver 1042 obtains calendar context information (such as when a particular subject is scheduled to attend a meeting) indirectly from a Lotus Notes calendar context source 1080. One skilled in the art can easily see that any other calendaring system 1081 could be used to supply the necessary information to the calendar context driver 1042. The instant messaging context driver 1043 maintains information on subject's instant messaging status. It obtains instant messaging status information from Sametime 1091 and from any other messaging system 1090.

As described above with respect to a preferred embodiment, the mediator 1020 performs aggregation of context information for complex queries. In an alternative embodiment, the individual context sources could themselves aggregate context data to produce a single view of one type of context data. For example, an 802.11 context aggregator could collect 802.11 data from many access points. It could then analyze that data to determine a single location estimate of the subject of interest. Requests made to it would then result in a single location estimate, possibly with associated quality of information estimates.

Alternatively, another individual context source, from the context service's perspective, could itself aggregate context data from multiple different sources to define a new type of context. In fact, context aggregators could be arranged in a hierarchical fashion, allowing arbitrarily more complex context data to be created. Such an architecture could be used for reasons of scalability, quality of information, administrative control, and so forth.

IV. System Operation

The system of the present invention services synchronous queries and asynchronous notification requests that arrive via the SCS API, as well as setContext requests that arrive via the context Push interface. All these requests are processed by the mediator 1020 in the manner described above. Further, individual context drivers may pull context information from relevant context sources, using an interface or protocol imposed by the context sources.

VI. Extensibility

Extensibility is an important feature for a context service, because the breadth of context continues to expand. This invention is particularly well suited to accommodate new types of context. In particular, the use of a forms-based interface plays an important role in this extensibility. To extend the context driver to a new type of context, an individual defines a context form for the new type of context and a programmer develops a context driver for that form of context. The context driver must be capable of obtaining context information of the new type from a context source and possibly of maintaining context records for the new type of context. Once the new context driver and the new context form have been defined and implemented, the system administrator sets the appropriate configuration parameters. These parameters instruct the context service as to where to find the implementations of the various context drivers and the new source of context data of the given type. These parameters are also used by the context service in dispatching requests for context information to the appropriate context driver. Once these steps have been completed, applications can make requests for the new type of context.

The use of forms allows all calls in the SCS API 1010 to have no knowledge of the details of the different types of context information. Consequently, adding a new type of context does not require any changes to the SCS API 1010. One alternative to using a forms metaphor is to add a new method call to the SCS API 1010 for each new type of context or for each new context query. One skilled in the art will recognize that this alternative complicates the problem of extending the SCS to handle new forms of context information.

VII. Scalability

Scalability refers to the capability of a system to withstand increased service load, accommodate growth of the user community, and enable simple integration of added resources.

To improve the scalability of the context service 1000 in terms of the number of requests and requesters, we assume that each raw context source can look up in a registry, such as a UDDI registry, to see if there is a context server collecting this type of context information about this subject. The registry indicates which server is collecting the subject information, what types of information are desired, and if required the public key for the subject. The information can be encrypted using the public key of the source and sent to a context driver of the correct type at the registered server. The context drivers attached to the context service 1000 accept properly formatted incoming connections from context sources and supply the information to the context service as before. Each context service 1000 has the capacity to provide context information on a fixed number of subjects. Scaling to large numbers of subjects is accomplished by increasing the number of secure context servers that are in operation. Applications are thus required to talk to the same registry as above to locate the context service which provides the context information needed for a particular subject. This technique is most effective when a subject is allowed to be represented by one or a small number of context servers.

The description of the present invention has been presented for the purposes of illustration and description, and is not intended to be exhaustive or limited to the invention in the form disclosed. Many modification and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for handling context information, comprising:
    (a) an interface for receiving a request for context information;
    (b) a mediator, coupled to receive the request from the interface, for determining to which one of a plurality of context drivers, external to said mediator, to route the request;
    (c) a plurality of context drivers, each coupled to the mediator, each context driver adapted to receive the request from the mediator and dynamically collect a predetermined type of changeable context information; and
    (d) a privacy engine coupled to at least one context driver, the privacy engine storing privacy preferences for each type of context information, and including means for denying or granting the request based upon the stored privacy preferences.

2. The system of claim 1, further comprising:
    at least one context information source, from which said each context driver is adapted to collect said predetermined type of context information.

3. The system of claim 1, wherein the request is represented by a form which includes a plurality of fields, and the privacy preferences can be specified for each field in the form.

4. The system of claim 1, further comprising:
    a context cache coupled to at least one context driver, the context cache storing the context information recently retrieved from the context information source.

5. The system of claim 1, further comprising:
    an event engine coupled to at least one context driver, for determining if there is the context information which satisfies the request.

6. The system of claim 5, wherein the event engine receives the request as an event subscription and attempts to match the event subscription against the context information if a context event of an arrival of the context information occurs.

7. The system of claim 6, wherein the event engine, if a match of the event subscription occurs, sends a notification to the context driver.

8. The system of claim 1, wherein the request is represented by a form, a type of which is predefined based on a type of the context information.

9. The system of claim 8, wherein each form includes a plurality of fields, and the interface receives the form at least one field of which is filled out as the request.

10. The system of claim 8, wherein the mediator determines the context drivers based on the type of the form.

11. The system of claim 8, wherein the system can be modified to handle additional types of context information by generating a new form corresponding to these additional types.

12. The system of claim 8, wherein said each context driver generates a response conforming to a format of the form.

13. The system of claim 1, wherein said each context driver collects the predetermined type of context information, independently of operations of the interface and the mediator.

14. The system of claim 1, further comprising:
a work pacer coupled to at least one context driver, the work pacer scheduling a timing of collecting the predetermined type of context information.

15. The system of claim 1, wherein the system can be scaled by registering types of the context information the system handles in a registry that can be referred to by another computer system.

16. A method for handling context information by a mediator, comprising the steps of:
receiving a request for the context information, said request including an identification and indicating information desired by a requester;
directing, based on the identification, the request to at least one of a plurality of context drivers external to said mediator, each of which is adapted to collect a predetermined type of changeable context information and to grant or deny requests based on stored privacy preferences for each type of context information;
dynamically collecting said predetermined type of context information from said at least one of the plurality of context drivers; and
returning a response including desired information comprising said predetermined type of context information collected by said at least one of the plurality of context drivers.

17. The method of claim 16, wherein said receiving step receives the request by means of a first form, contents of which are filled by the requester.

18. The method of claim 17, wherein said returning step returns the response in a second form conforming to a format of the first form.

19. The method of claim 16, further comprising the step of:
checking, after the receiving step, authorization of the requester to receive the information.

20. A system for handling changeable context information, comprising:
(a) an interface for receiving a request for context information;
(b) a mediator, coupled to receive the request from the interface, wherein said mediator comprises determining means for determining to which one or more of a plurality of context drivers to route the request, wherein each of said plurality of context drivers are external to said mediator, coupled to the mediator, and adapted to receive a request from the mediator and dynamically collect a predetermined type of changeable context information, a privacy engine coupled to at least one context driver, the privacy engine storing privacy preferences for each type of context information, and including means for denying or granting the request based upon the stored privacy preferences, and interface means for sending the request to the determined context drivers and for receiving the context information from the determined context drivers.

* * * * *